United States Patent [19]

Behr

[11] Patent Number: 4,685,309

[45] Date of Patent: Aug. 11, 1987

[54] PULSE CONTROLLED EXPANSION VALVE FOR MULTIPLE EVAPORATORS AND METHOD OF CONTROLLING SAME

[75] Inventor: Joseph L. Behr, St. Louis, Mo.

[73] Assignee: Emerson Electric Co., St. Louis, Mo.

[21] Appl. No.: 822,192

[22] Filed: Jan. 24, 1986

Related U.S. Application Data

[63] Continuation of Ser. No. 643,250, Aug. 22, 1984, Pat. No. 4,578,534, which is a continuation of Ser. No. 438,360, Nov. 1, 1982, abandoned.

[51] Int. Cl.$^4$ ............................................. F25B 41/00
[52] U.S. Cl. ....................................... 62/212; 62/223; 251/129.05
[58] Field of Search ................. 62/223, 211, 225, 212; 251/129.05

[56] References Cited

U.S. PATENT DOCUMENTS

| | | | |
|---|---|---|---|
| 2,534,455 | 12/1950 | Koontz | 62/4 |
| 2,960,840 | 11/1960 | Hosken et al. | 62/81 |
| 3,456,455 | 7/1969 | Sarir | 62/233 |
| 3,577,743 | 5/1971 | Long | 62/212 |
| 4,112,703 | 9/1978 | Kountz | 62/211 |
| 4,283,921 | 8/1981 | Prosky | 62/126 |
| 4,290,274 | 9/1981 | Essex | 62/157 |
| 4,420,113 | 12/1983 | Lacroix | 236/1 EB |

*Primary Examiner*—William E. Wayner
*Attorney, Agent, or Firm*—Polster, Polster and Lucchesi

[57] ABSTRACT

A pulse controlled refrigeration expansion valve for multiple evaporators and method of controlling the valve is disclosed. The refrigeration system on which this invention is typically used includes a single source of pressurized refrigerant and a plurality of evaportors. Each evaporator has an expansion valve associated therewith which is preferably an on/off (open/closed) direct controlled solenoid valve. The valve is periodically energized (opened) and de-energized (closed) in response to a parameter (e.g., superheat) of its respective evaporator such that the ratio of energization time/de-energization time during each period (e.g., 4 seconds) of operation of the valve is varied in response to the system parameter(s) and such that the on/off solenoid valve functions as a modulated refrigerant flow control expansion valve. A temperature sensor is provided which senses the temperature of the space being refrigerated by a respective evaporator (e.g., the interior of a freezer cabinet in a supermarket) so that upon the temperature of the refrigerated space controlled by the respective valve being within a predetermined temperature range, the temperature sensor will override the control for the solenoid valve thus closing the valve and stopping the flow of refrigerant through the respective evaporator while refrigerant continues to flow to other evaporators.

1 Claim, 10 Drawing Figures

PULSE CONTROLLED EXPANSION VALVE FOR MULTIPLE EVAPORATORS AND METHOD OF CONTROLLING SAME

This is a continuation of copending application Ser. No. 643,250, filed on Aug. 22, 1984, now U.S. Pat. No. 4,578,534 which is a continuation of application Ser. No. 438,360, filed Nov. 1, 1982, now abandoned.

BACKGROUND OF THE INVENTION

This invention relates to apparatus for and a method of controlling a refrigeration system. More specifically, this invention is concerned with a refrigeration system having a plurality of evaporators which are supplied high pressure refreigerant from a single source. Each evaporator is independently controlled by an expansion valve, such as a solenoid operated valve, and a control system responsive to a parameter of the refrigeration system for controlling operation of the solenoid valve thereby to regulate the flow of refreigerant through the respective expansion valve. Even more specifically, this invention relates to a solenoid valve which is periodically energized and de-energized (i.e., opened and closed) during each period of operation of the valve and a control system responsive to a refrigeration system parameter (e.g., superheat) which varies the ratio of the energization time to the de-energization time of the solenoid valve during each period of operation of the valve so as to regulate the flow of refreigerant through the valve. Still further, this system has a temperature sensor (e.g., a thermostat) within the refrigerated space served by a specified evaporator which senses the temperature within the refrigerated space and overrides the control system to block the flow of refreigerant when the temperature of the refrigerated space is below a specified level.

Typically, a refrigeration system includes a compressor, a condenser coil, an expansion device, and an evaporator coil. Refrigerant vapor is compressed to high pressure by the compressor and is directed into the condenser where the high pressure refrigerant vapor is condensed to a high pressure liquid. Many refrigeration systems such as in multiple refrigerated cabinets in a supermarket or in a multiple evaporator air conditioning system, have a plurality of evaporators supplied with refrigerant from a common condenser. An expansion device is provided between the condenser and each of the evaporators so that liquid refrigerant from the condenser may be adiabatically expanded before it enters the evaporator. In the evaporator, the low pressure refreigerant absorbs heat from the surroundings and is at least in part transformed into a vapor which is returned via a suction line to the inlet of the compressor.

In many conventional refrigeration systems, the expansion device is a so-called thermostatic expansion valve. Typically, a thermostatic expansion valve has an expansion port therein and a valve member for regulating the flow of refreigerant through the expansion port. A spring biases the valve member toward its closed position. A diaphragm actuator is provided. One side of the diaphragm is exposed to suction gas pressure while the other side is connected via a capillary tube to a thermostatic bulb in heat transfer relation with the refreigerant vapor (referred to as the suction gas) exhausted from the evaporator. The bulb is charged with a suitable volatile fluid (e.g., a refrigerant) and thus exerts a pressure force on the valve member via the diaphragm actuator counteracting the force of the spring and the suction gas pressure. Upon the thermostatic bulb's sensing an increase in temperature of the suction gas with respect to its' pressure, the net pressure force exerted on the diaphragm actuator is correspondingly increased thereby to further open the valve and to permit more refreigerant to flow through the evaporator thus resulting in a lowering of the suction gas temperature. Upon sensing a decrease in suction gas temperature, the thermostatic bulb will decrease the pressure force exerted on the diaphragm actuator and thus will permit the spring to at least partially close the valve thus lowering the flow of refreigerant into the evaporator and, in turn, raising the temperature of the suction gas.

Generally, a thermostatic expansion valve is adjusted or set to maintain the suction gas at a predetermined superheat level or setting. Superheat is a term of art which is defined as the temperature of the refrigerant vapor above the evaporated temperature of the refreigerant at the specified pressure of the refreigerant. In many refrigeration systems, the thermostatic expansion valve is preset at the factory so as to maintain a predetermined superheat level and it is impossible or impractical to vary the superheat setting of typical thermostatic expansion valves during operation of the refrigeration system so as to control the flow of refrigerant through the evaporator in response to changes in the operating conditions of the refrigeration system thereby to maximize the operating efficiency of the refrigeration system.

In an effort to overcome the shortcomings of prior thermostatic expansion valves in which the superheat setting could not be varied during operation of the refrigeration system in response to changing operating conditions (e.g., changes in the refrigeration heat load or in the outside ambient air temperature), so-called electrically operated, modulating expansion valves were developed. Such electrically operated modulating expansion valves are disclosed in the coassigned U.S. Pat. No. 3,967,781. In this electrically operated expansion valve, a plurality of bi-metallic elements and heating elements are interleafed so that upon energization of the heating elements, the bi-metallic elements expand in axial direction thereby to open the valve. Upon de-energization of the heaters, the bi-metallic metals cool and contract in axial direction thus effecting closing of the valve. This electrical heater/bi-metal actuator is often times referred to as a heat motor. By controlling the heat generated by the heaters in the heat motor, this electrically operated expansion valve could be regulated in response to system parameters (e.g., superheat) so as to regulate the flow of refrigerant through the valve.

While these prior electrically operated expansion valves worked well for their intended purpose, they had certain drawbacks in that they did require the above-mentioned heat motor actuator which was expensive. Thus, there has been a longstanding need for a low-cost, electrically operated expansion valve which has a fast response time and which is operable to regulate refrigerant flow in proportion to the requirements of the refrigeration system.

As heretofore mentioned, in many refrigeration systems having multiple evaporator coils supplied with high pressure, liquid refrigerant from a common compressor and condenser, it is advantageous to not only independently control or modulate the flow of refreigerant through each of the evaporator coils in response to a parameter associated with each of the coils, but it is also desirable to completely block the flow of refreigerant through a selected evaporator coil in the event the refrigerated space (i.e., the interior of a refrigerated cabinet or the interior of a room) cooled or refrigerated by the respective evaporator coil reaches a predetermined temperature level. However, it is also desirable that the refreigerant be permitted to flow to others of the plurality of evaporator coils supplied refreigerant by the common condenser. Heretofore, in addition to the expansion device, it was necessary to provide an independently operable solenoid valve to selectively block the flow of refreigerant to each evaporator coil. The requirement of an additional solenoid valve and a control for each solenoid valve added considerably to the complexity and cost of these systems.

SUMMARY OF THE INVENTION

Among the many objects and features of the present invention may be noted the provision of apparatus for and a method of controlling a refrigeration system expansion valve in response to a parameter of the refrigeration system;

The provision of such apparatus and method which utilizes a low-cost, directly operated solenoid valve which is repeatedly or periodically energized and de-energized in response to the refrigeration system parameter being monitored in such manner that the on/off cycles of the valve are integrated to result in a steady state, but variable regulation of the flow of refrigerant through the refrigeration system;

The provision of such apparatus and method which utilizes an open/closed, non-modulating electrically operated expansion valve functioning as a modulating proportional refreigerant flow control valve;

The provision of such apparatus and method which may be used in a refrigeration system having a plurality of evaporator coils so as to refrigerate respective refrigerated spaces, such as separate refrigerated display cases, and in which the temperature of each refrigerated space served by an evaporator is sensed and is controlled by a respective periodically energized expansion valve so that the flow of refreigerant through the respective evaporator coils may be selectively blocked upon the temperature in that evaporator coil's respective refrigerated space attaining a desired level while refrigerant continues to flow to the other evaporator coils;

The provision of such apparatus and method which permits the superheat of a respective evaporator to be continuously controlled such that effective length of the evaporator may be varied or modulated; and The provision of a solenoid valve for use in a refrigeration system proportional flow control system, as above described, which is of low cost, which has a long service life, which has a fast response time, and which is reliable in operation.

Briefly stated, apparatus of this invention is intended for use in a refrigeration system having a common condenser and a plurality of evaporators, each of the evaporators refrigerating a respective refrigerated space and having a respective expansion valve for controlling the flow of high pressure liquid refrigerant supplied from the common condenser to its respective evaporator. Each expansion valve is a solenoid valve having a valve body with a flow passage therein for the flow of refreigerant therethrough. The valve body has a valve seat constituting a portion of this flow package and a valve member selectively movable between a closed position in which it is sealingly engageable with the valve seat so as to block the flow of refrigerant and an open position permitting the flow of refrigerant. Further, control means is provided for periodically opening and closing the solenoid valve thereby to regulate the flow of refreigerant through the solenoid valve. Specifically, the improvement of this invention comprises at least one means for sensing the temperature of the refrigerated space of one of the evaporator coils and for generating a signal in response to the above-said temperature. Control means is provided for the one solenoid valve which is responsive to the above-mentioned signal so as to block the flow of refrigerant to the above-said one evaporator when the temperature of the refrigerated space served by the above-said one evaporator is below a predetermined temperature level.

The method of this invention involves controlling a refrigeration system having a source of high pressure liquid refrigerant which is supplied to a plurality of evaporators in parallel communication with the source of pressurized liquid refrigerant. Each of the evaporators has a respective refrigerated space associated therewith and further has a solenoid operated expansion valve for controlling the flow of refrigerant through each of the evaporators. Each of these expansion valves is independently selectively operable between an open and a closed position upon energization and de-energization of the solenoid valve. Specifically, the method comprises monitoring a first parameter associated with each of the evaporators of the refrigeration system. A first signal is generated in response to this first parameter. This first signal of a respective evaporator is utilized to effect periodic energization and de-energization of the solenoid valve controlling this respective evaporator with the ratio of energization time to the length of the period of the solenoid valve being responsive to the signal so as to independently regulate the flow of refreigerant through the evaporator. The temperature of at least one refrigerated space served by a respective evaporator is monitored and a second signal is generated which is responsive to the temperature of this at least one refrigerated space. Upon the temperature of this at least one refrigerated space decreasing below a predetermined temperature level and upon the second signal attaining a predetermined value, energization of the solenoid valve by the control system is overridden thereby to maintain the one solenoid valve closed and to block the flow of refrigerant through this at least one evaporator until the temperature within the respective refrigerated space increases above a predetermined temperature level.

Other objects and features of this invention will be in part apparent and in part pointed out hereinafter.

BRIEF DESCRIPTION OF THE DRAWINGS

Corresponding reference characters indicate corresponding parts throughout the several views of the drawings.

DESCRIPTION OF PREFERRED EMBODIMENTS

Figure 1:
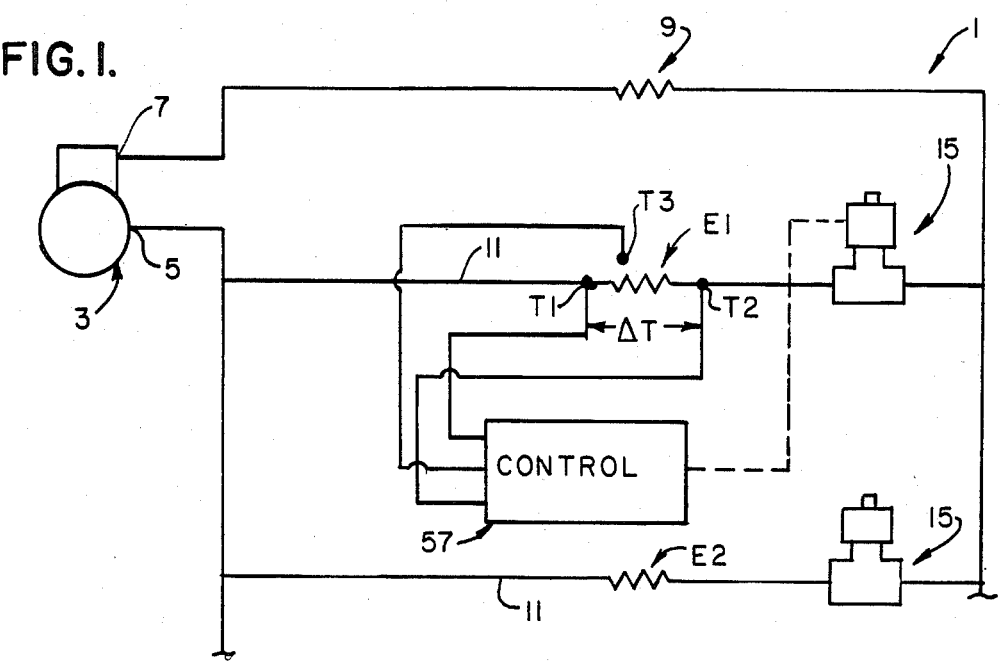
FIG. 1 is a diagrammatic view of a refrigeration system having a single refrigerant compressor and condenser supplying refrigerant to a plurality of evaporators with each of the evaporators being independently controlled by an on/off solenoid valve controlled in accordance with the apparatus and method of the present invention.

Referring now to the drawings, and in particular to FIG. 1, a refrigeration or air conditioning system is indicated in schematic form by reference character 1. In particular, this refrigeration system is shown to be particularly adapted for supplying high pressure liquid refrigerant to a series of refrigerated or freezer cabinets such as may be found in a supermarket. Specifically, this refrigeration system is shown to include a hermetic compressor 3 having an inlet 5 and an outlet 7. The outlet 7 of the compressor is connected to a condenser coil, as generally indicated at 9. The outlet of condenser coil 9 supplies high pressure, liquid refrigerant in parallel to a number of evaporator coils (also referred to as heat transfer means) as generally indicated at E1, E2,.... The outlets of the evaporator coils are connected to a suction line 11 which returns low pressure vaporized refrigerant to the inlet 5 of compressor 3. In addition, between each evaporator coil and the high pressure liquid refrigerant line, an expansion device or valve, as generally indicated at 15, is provided.

Figure 2:
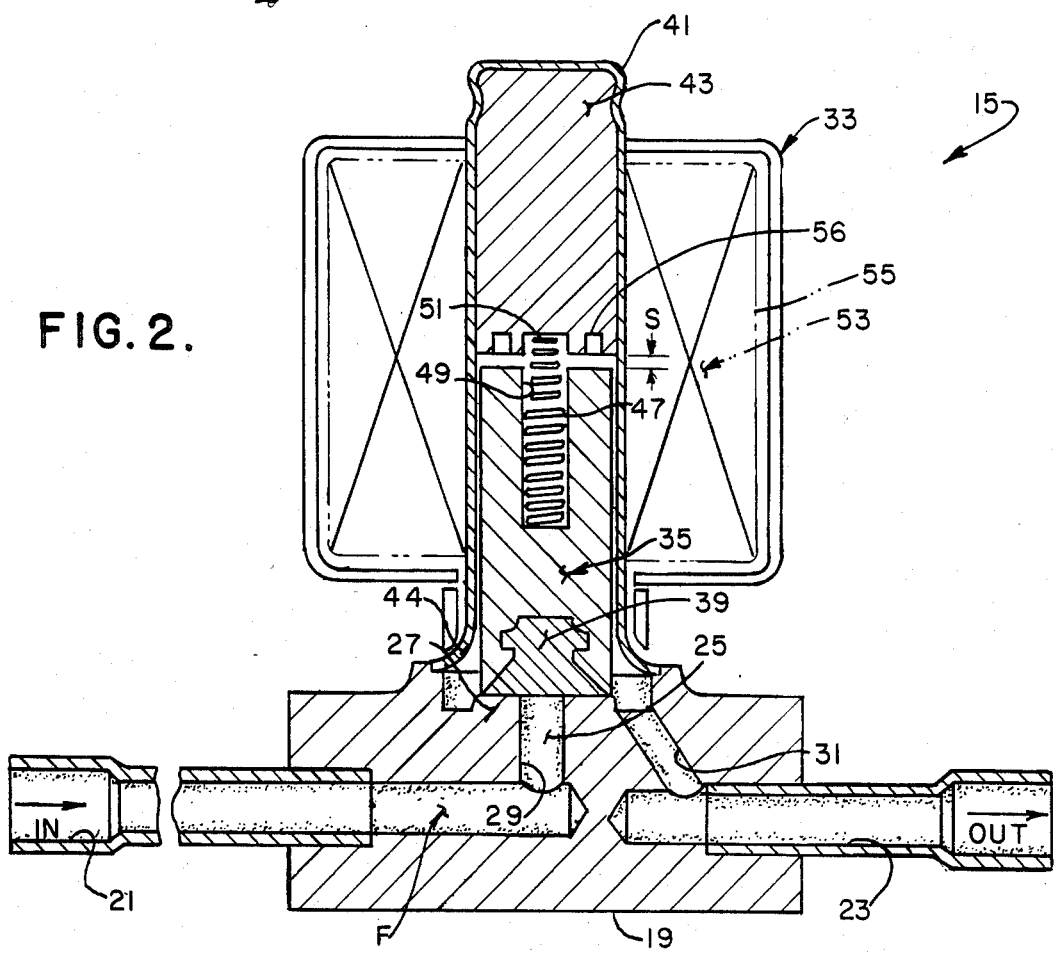
FIG. 2 is an enlarged cross-sectional view of a solenoid control valve.

Referring now to FIG. 2, a detailed description of one embodiment of an expansion valve 15 will be provided. preferably, expansion valve 15 is a low-cost, direct operated solenoid actuated valve. It will be understood that when the solenoid valve 15 is energized, it is fully opened and when it is de-energized, all flow of refrigerant through the valve is blocked. Valve 15 includes a valve body 19 having a flow passage F extending therethrough with the flow passage having an inlet 21 and an outlet 23. As is conventional, flared tubing ends are sealably secured (soldered) to valve body 19 so as to constitute the inlets and outlets 21 and 23, respectively. These flared tubing ends permit the valve to be readily incorporated in the refrigerant lines of refrigeration system 1, such as by soldering the tubing ends in place. An expansion valve port 25 is provided in flow path F intermediate the inlet and outlet ends of the flow path and this expansion port 25 is constituted by an annular shoulder or valve seat 27 facing generally upwardly (as viewed in FIG. 2). A perpendicular passage 29 is concentric within valve seat 27 and permits refrigerant to flow upwardly to the valve seat from flow passage F. An oblique passage 31 is provided downstream from expansion port 25 and permits the passage of refrigerant from the expansion port to outlet 23.

As generally indicated at 33, a solenoid actuator is provided for valve 15. This solenoid actuator includes a valve member, as generally indicated at 35, axially shiftable between a closed position (as shown in FIG. 2) in which the valve member is sealingly engageable with valve seat 27 thereby to block the flow of refrigerant through flow passage F and an open position (not shown) in which the valve member is raised in axial direction clear of valve seat 27 thereby to permit the flow of refrigerant through flow passage F. The valve member 35 is axially shiftable through a stroke S, as shown in FIG. 2, as it is moved between its closed and open positions. Preferably, this stroke is limited to be a short distance, for example 0.020 inches (0.5 mm.) thereby to limit valve member velocity upon actuation and to limit impact of forces as the valve opens and closes.

On the lower end of valve member 35, an elastomeric seal 39 is provided which, when valve member 35 is in its closed position, sealably engages valve seat 27 thereby to sealably close flow passage F. Of course, when valve member 35 is in its open position, seal 39 is clear of the valve seat and permits the flow refrigerant through flow passage F to its respective evaporator E1, E2, etc.

Solenoid actuator 33 further comprises an axial tube 41 which has a solenoid core 43 disposed therein and fixedly held in place within tube 41. This core is preferably made of a suitable ferromagnetic material. The lower end of tube 41 is flared outwardly, as indicated at 44, and this flared end is sealably secured (e.g. welded) to valve body 39 thereby to seal the tube relative to the valve body and to prevent leakage of refrigerant.

A conical coil compression spring 47 is interposed between movable valve member 35 and core 43 thereby to resiliently bias valve member 35 away from core 43 toward its closed position in engagement with valve seat 27. As is shown, spring 47 is disposed in a blind hole 49 in the upper end of the valve member and the upper end of the spring is received in a corresponding blind counterbore 51 provided in the bottom face of core 43. It will be understood that the diameter of hole 49 and of counterbore 51 in valve member 35 and in core 43 are somewhat larger than the maximum diameter of spring 47 thereby to permit compression of the spring without binding of the spring on the walls of the blind hole or counterbore. Preferably, compression coil spring 47 is a conical coil spring having its smallest diameter at its top in engagement with core 43 and thus constitutes a so-called increasing spring rate spring in which the spring constant of the spring increases with increased deflection of the spring. Thus, the spring is compressed its maximum amount and exerts a maximum biasing force on valve member when valve member 35 is fully withdrawn into the bore of the solenoid. A solenoid coil 53 (shown in phantom) surrounds tube 41. This solenoid coil is enclosed by a sheet metal cover 55. It will be understood that suitable electrical lead wires (not shown) for the coil extend from housing 55 thereby enabling the coil to be selectively energized and de-energized. As will be hereinafter disclosed the system for controlling valve 15 operates on AC and, in some instances, it may be preferable that a shading band, as indicated at 56, be provided. Valve 15 is substantially identical with the valve disclosed in the co-assigned U.S. Patent application Ser. No. 354,136 to David P. Hargraves, however valves of other constructions may be employed.

In accordance with this invention, as indicated generally at 57, means is provided responsive to one or more refreigerant system parameters for controlling operation of each of the on/off solenoid expansion valves 15 for regulating the flow of refreigerant through the refrigeration system 1 and for sensing the temperature within a refrigerated space cooled by a respective evaporator E1, E2 etc. so as to override the control of each respective valve 15 and to block the flow of refreigerant to its respective evaporator upon its temperature of the refrigerated space falling below a predetermined temperature level.

More specifically, control means 57 includes a power supply for periodically (repeatedly) energizing and de-energizing each valve 15 with the ratio of the energization (open) time of the valve relative to the de-energization (closed) time of the valve being responsive to the refrigeration parameter (e.g., superheat) being monitored thereby to regulate the flow of refreigerant through the refrigeration system so as to maintain the temperature of the refreigerant exiting its respective evaporator E1, E2... (or flowing through suction line 11) to be within a predetermined superheat range. Control means 57 operates continuously comparing the refrigeration system parameter being monitored against a known value. Upon detecting an error between the monitored parameter and the reference or known value, the output voltage signal supplied to a respective solenoid valve 15 is correspondingly varied thereby to eliminate the error between the system reference and the parameter being monitored. While many system parameters, such as ambient air temperature or the temperature of the lubricant of the sump of the compressor 3, may be monitored, a preferred system parameter is the superheat temperature of the suction gas discharged from the evaporator in suction line 11. This superheat may be measured by temperature sensors T1 and T2 at the outlet and inlet of an evaporator coil E1, as shown in FIG. 1, thus measuring the temperature difference between the refrigerant after it has passed through valve 15 and as it exits evaporator E1.

Additionally, control means 57 includes an override parameter, such as another temperature sensor indicated at T3, which is located within the refrigerated space cooled or refrigerated by a respective evaporator. In FIG. 1, temperature sensor T3 is shown to be proximate evaporator E1 so as to measure the temperature of the air surrounding the evaporator. It will be understood that in a multiple evaporator refrigerated display case application, the temperature sensor T3 may monitor (and thus serve as a thermostat) for the interior of the display case. In other applications, such as in room air conditioner or heat pump applications in which each room has a separate evaporator, the temperature sensor T3 may serve as a room thermostat controlling operation of the evaporator in that particular room. Alternatively, the override parameter may be a signal from a timer which shuts off and turns on a respective evaporator at various prescribed times of the day or according to outside ambient temperature conditions.

Figure 6:
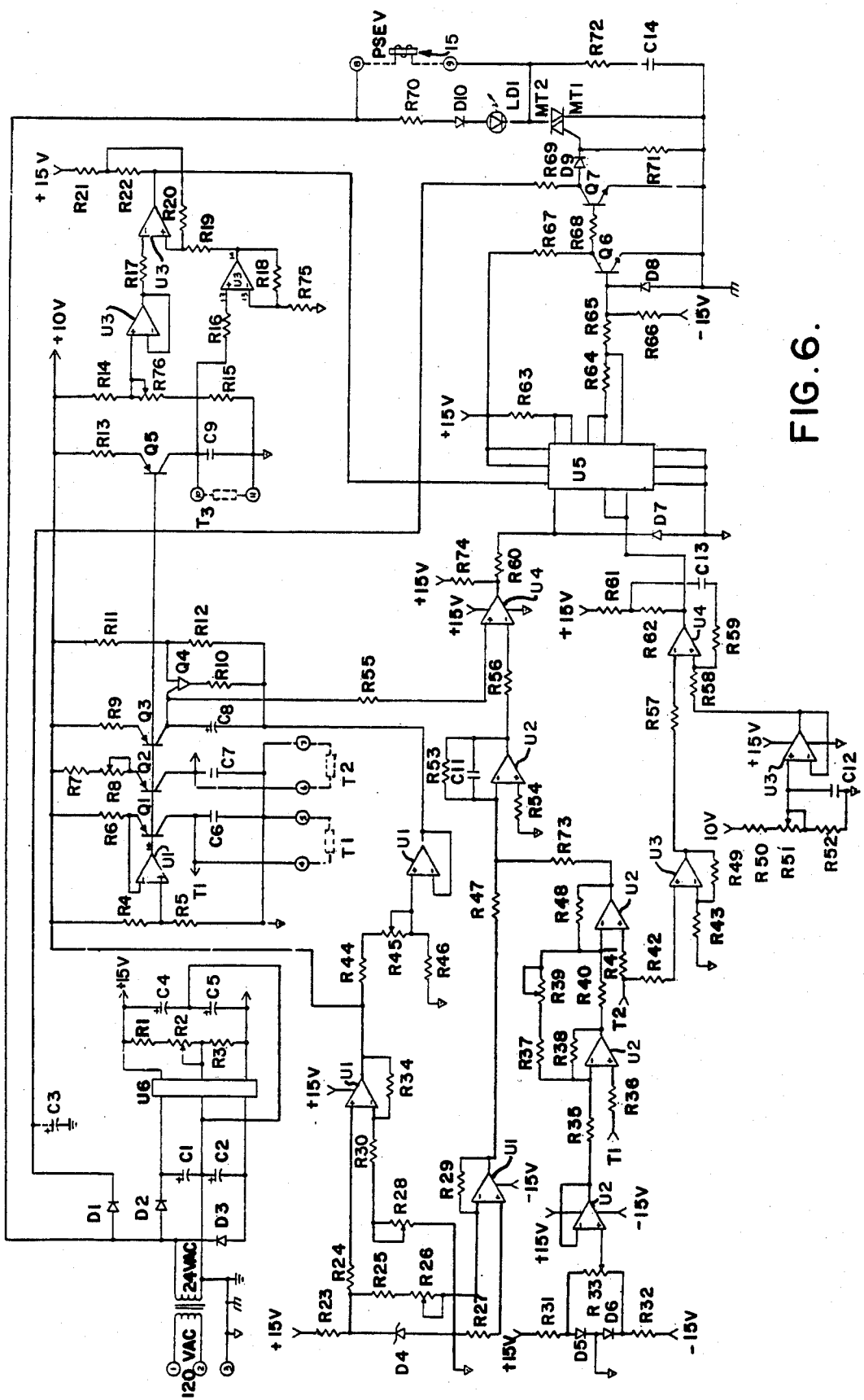
FIG. 6 is an electrical schematic of a control system of the present invention.

More particularly, temperature sensor T3 and the circuitry shown in FIG. 6 connected to sensor T3, serves as an override for the control function of means 57 when operating in response to the system parameter (e.g., superheat). In operation, upon the refrigerated space whose temperature is being sensed by temperature sensor T3 attaining a desired temperature level, a signal will be generated by temperature sensor T3 (and by the circuitry connected thereto within control means 57) thereby to override the control and to de-energize its respective valve 15 so as to block the flow of refreigerant through its respective evaporator coil. In this manner, temperature sensor T3 serves as a thermostat and shuts off the flow of refreigerant through its respective evaporator coil and yet permits refreigerant to flow through liquid refreigerant line 11 to others of the evaporator coils such as may be demanded by their respective control means 57.

Figure 3:
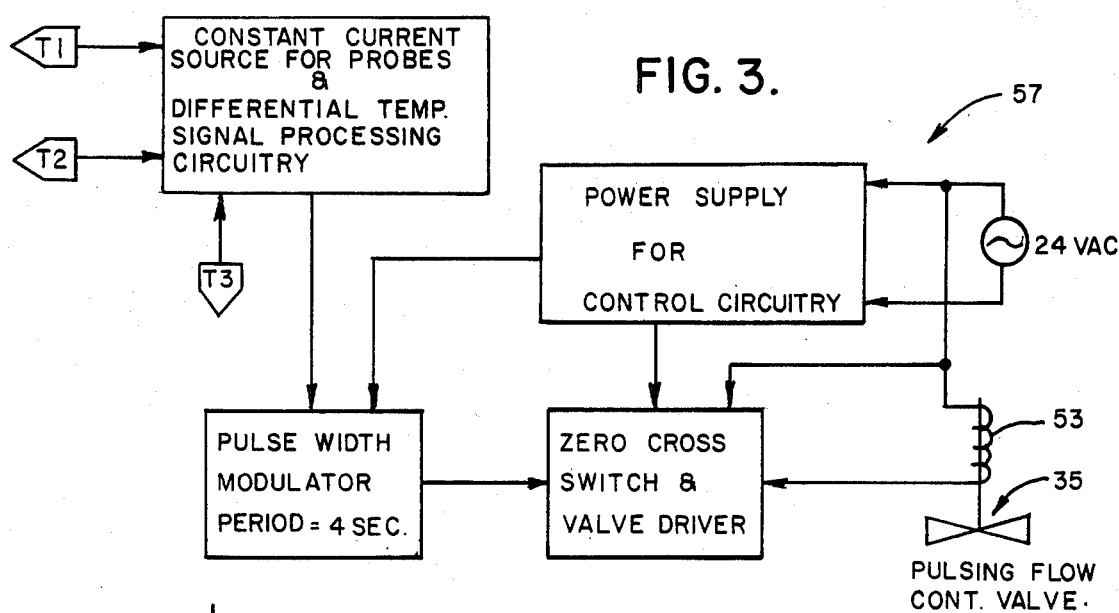
FIG. 3 is a block diagram of the control system for controlling operation of one of the solenoid valves illustrated in FIG. 2.

Referring to FIG. 3, a block diagram of the principal functional aspects of one preferred control system 57 of the present invention is shown. In FIG. 6, the circuitry for carrying out this block diagram is presented. The values for the components of the circuitry of FIG. 6 are disclosed in the following tables.

| Resistors | |
|---|---|
| Component Number | Resistance (Ohms) |
| R1, R46 | 4.02K |
| R3 | 4.22K |
| R4 | 2.21K |
| R5, R27 | 8.25K |
| R6, R30, R13, 14 | 1.96K |
| R7 | 1.62K |
| R9 | 330K |
| R10 | 43 |
| R11, R66 | 100K |
| R12 | 64.8K |
| R15 | 20K |
| R17, R19, R57, R58 | 1.1K |
| R18 | 13.3 |
| R20, R59 | 348K |
| R21, R25, R61, R67, R74 | 10K |
| R22, R36, R41, R42, R43 | 1K |
| R55, R56, R60, R62 | 1K |
| R23, R38, R40 | 2.49K |
| R24 | 1.5K |
| R29 | 24.9K |
| R31, R32, R50 | 3.16K |
| R34, R44 | 6.19K |
| R35, R48 | 280K |
| R37 | 123K |
| R47, R53, R73 | 49.9K |
| R49 | 9.09K |
| R51 | |
| R52 | 6.8K |
| R54 | 16.4K |
| R63 | 11K |
| R64, R65 | 1.78K |
| R68 | 3.3K |
| R71 | 22K |
| R69 | 6.19K |
| R70 | 2K |
| R72 | 100 |
| R2, R8, R28, R76 (Trimpots) | 500 |
| R26, R33, R45, R16, R75 (Trimpots) | 1K |
| R39 (Trimpot) | 500K |

| Capacitors | |
|---|---|
| Component Number | Capacitance (micro-farads) |
| C1, C2 | 330 |
| C3 | 100 |

-continued

Capacitors

| Component Number | Capacitance (micro-farads) |
| --- | --- |
| C4, C5, C12 | .1 |
| C6, C7, C9, C13 | .01 |
| C11 | .33 |
| C14 | .47 |
| C8 | 10 |

Miscellaneous Components

| Component Number | Description and Designation |
| --- | --- |
| D1, D2, D3, D7, D8, D9, D10 | Diode: IN 4001 |
| D5, D6 | Diode: IN 4149 |
| D4 | Diode: LM 336 |
| LD1 | Led: Red |
| Q1, Q2, Q3, Q5 | Transistor: 2N3906 |
| Q4 | Transistor: 2N6028 |
| Q6, Q7 | Transistor: 2N3904 |
| CR1 | Triac: T2323 |
| U1, U2, U3 | I.C. Quad Op-Amp CA324 |
| U4 | I.C. Quad Comparator CA339 |
| U5 | I.C. Multiplexer CD4066BE |
| U6 | I.C. pos; neg; volt. reg. NE5554U |

From the above description and from the diagrams and schematics presented in FIGS. 3 and 6, one skilled in the art could construct and operate control means 57 and thus a detailed description of the construction and operation of the control system has been eliminated as being unnecessary.

Figure 5:
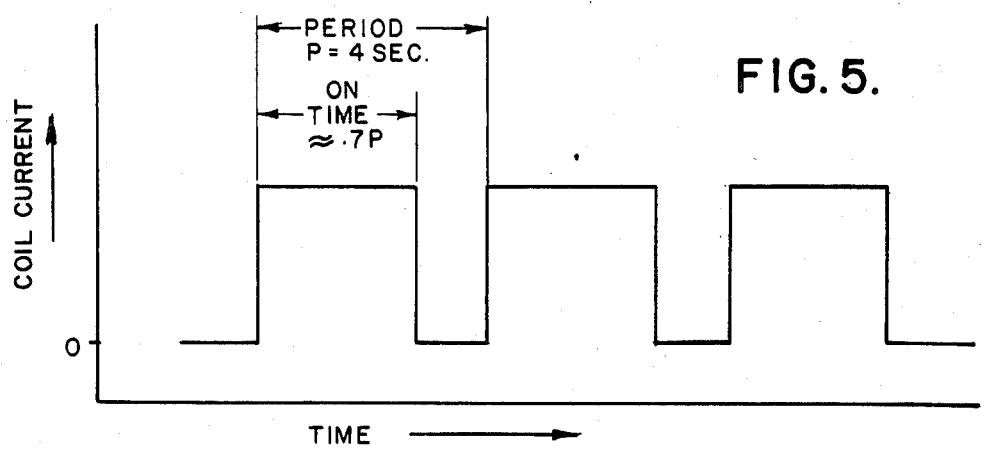
FIG. 5 is a plot of coil current energizing the solenoid actuator of the solenoid valve versus time.

As heretofore mentioned, valve 15 is periodically energized and de-energized. As used herein, the term "periodically" is defined to mean the control means 57 operates continuously (at least while it is in operation), but that it operates in a series of continuous periods P of uniform or constant time, as shown in FIG. 5. Each period P is of a length of time which is considerably shorter than the normal time response (or time constant) of the evaporator. For example, assume that the parameter being controlled is superheat. When the valve opens superheat begins to drop. The time response of a typical evaporator is such that if the valve stayed fully open, about 20 seconds would be required for a significant drop in superheat to take place. Since the valve is typically open for less than 4 seconds, the effect is a relatively smooth control of superheat. The thermal mass and other characteristics of the evaporator are such that the evaporator does not respond fast enough for the controlled parameter to follow each pulse of the valve.

As shown in FIG. 6, control means 57 is an alternating current (A.C.) output triggering circuit which automatically initiates the output of the solenoid current at the start of each period and which selectively terminates or breaks the solenoid current output at a point during each period P in response to the refrigeration system parameter being monitored and the error signals generated upon comparing the desired system parameter to the selected reference. However, those skilled in the art will recognize that with suitable modifications, the control system may be a D.C. circuit. Specifically, control means 57 varies the ratio of energization time of solenoid valve 15 to the de-energization time of the valve during each period P in response to the above-noted error signal. It will be appreciated that if the error signal is zero (or some other preselected value), the voltage output signal supplied to the solenoid valve is terminated at time zero during each period P and the solenoid valve is not energized at all. Thus, valve 17 remains closed and blocks the flow of all refreigerant through the refrigeration system. If the error signal is at or exceeds another preselected value, the voltage output signal remains on during the entire period P and thus the solenoid valve continuously remains open and permits a maximum flow of refreigerant through refrigeration system 1. It will be appreciated that by proportionally varying the energization time to the de-energization time during each period P between the upper and lower error signal limits, as above described, the discrete on/off solenoid 15 functions as an infinitely variable modulating refreigerant control valve.

Figure 4:
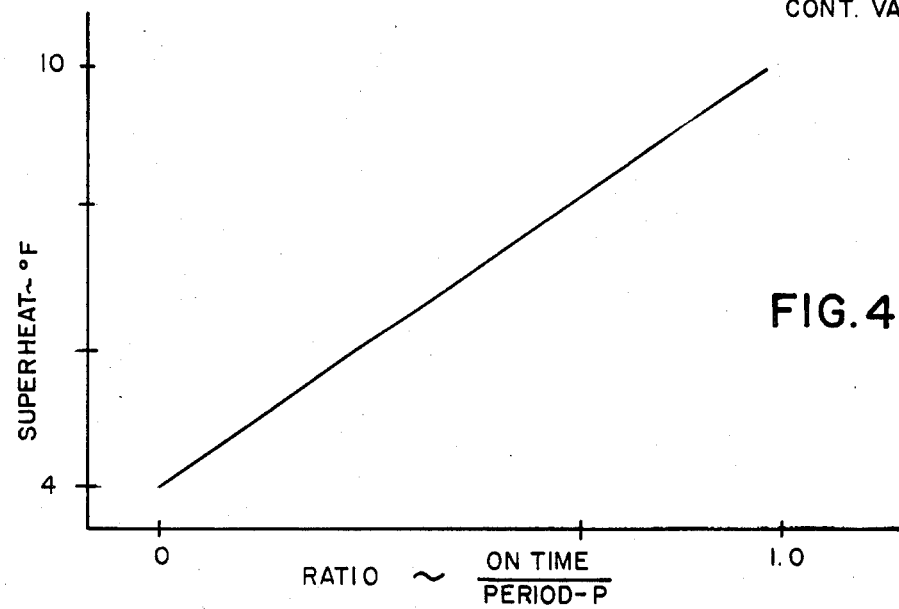
FIG. 4 is a plot of superheat temperature of the refreigerant versus the ratio of energization time to de-energization time during each period of operation of one of the solenoid valve.

In an application in which the superheat of the refreigerant and suction line 11 is used as the system parameter and in which the superheat is desired to be maintained at a predetermined level (e.g., 8°F.), it is seen in FIG. 4 that the ratio of on time or energization time for solenoid operated valve 15 equals about 0.7 such that the desired superheat of the refreigerant is maintained. In FIG. 5, it is shown that the ratio of on (or energization) time of valve 15 in relation to the entire period is also about 0.7. If, for example, the period P is about 4 seconds, the on (or energization) time for solenoid valve 15 will amount to approximately 2.8 seconds and the off (or de-energization) time for the valve will amount to about 1.2 seconds.

If the superheat sensed by control means 57 is above the pre-selected value for the superheat (e.g., 8°), control means 57 will increase the on time of the valve. If, on the other hand, the superheat sensed is too low, the control means correspondingly reduces the on time thereby to bring the superheat to the desired, predetermined level.

As noted above, the period P is relatively small in regard to the time constants or time response of refrigeration system 1. Thus, control system 57, in effect, integrates the on-off steps of solenoid valve 15 into an essentially steady state operating condition. For example, if the ratio of on time to the period equals 0.5, this would correspond to the valve being throttled to an intermediate position between its closed and full open position so as to permit the flow of about one-half of the flow rate of refrigerant as when in its full open condition. Of course, if the ratio of on time to period P is zero, the valve is closed and the flow of all refrigerant therethrough is blocked, and if the ratio is 1, the valve stays ope for the entire period and thus the maximum flow rate of refrigerant is free to flow through the valve.

Further in accordance with this method, an override parameter, such as the temperature of a refrigerated space served by a respective one of the above-mentioned multiple evaporators E1, E2, etc. is monitored by a respective sensor T3 and an override signal is generated in response to the temperature of this refrigerated space. Upon the temperature of this one refrigerated space decreasing below a first predetermined temperature level (i.e., when the temperature of a refrigerated display case is lowered to within its desired temperature range), and upon this override signal attaining a predetermined value (referred to as a first signal), the energization of the solenoid valve 15 for this one evaporator E1 is overridden thereby to maintain this one solenoid valve closed and to block the flow of refrigerant through this one evaporator until the temperature of the refrigerated space served by the evaporator increases above another predetermined temperature level. A more detailed description of the operation of control 57 will be provided hereinafter.

The circuitry for control means 57 is schematically depicted in FIG. 6. It will be understood that the circuitry depicted in FIG. 6 constitutes only one control circuit for operating the on/off solenoid valve 17 in accordance with this invention and that any number of suitable control circuits may be utilized. The above-described control system varies the ratio of the valve open time to the total period P proportionally to the monitored refrigeration system parameter (e.g., temperature differential between evaporator inlet and outlet). In a second type of optional controller, a sample and hold technique may be employed. In this second controller, the control parameter is sampled on an instantaneous basis and a finite step change in the ratio of on time to the period P is made on the basis of a predetermined program relationship between the instantaneous value of the controlled parameter and the step change in the on time/period ratio. In other words, the size of the step change in the on time/period ratio is a function of the value of the controlled parameter.

Figure 6A:
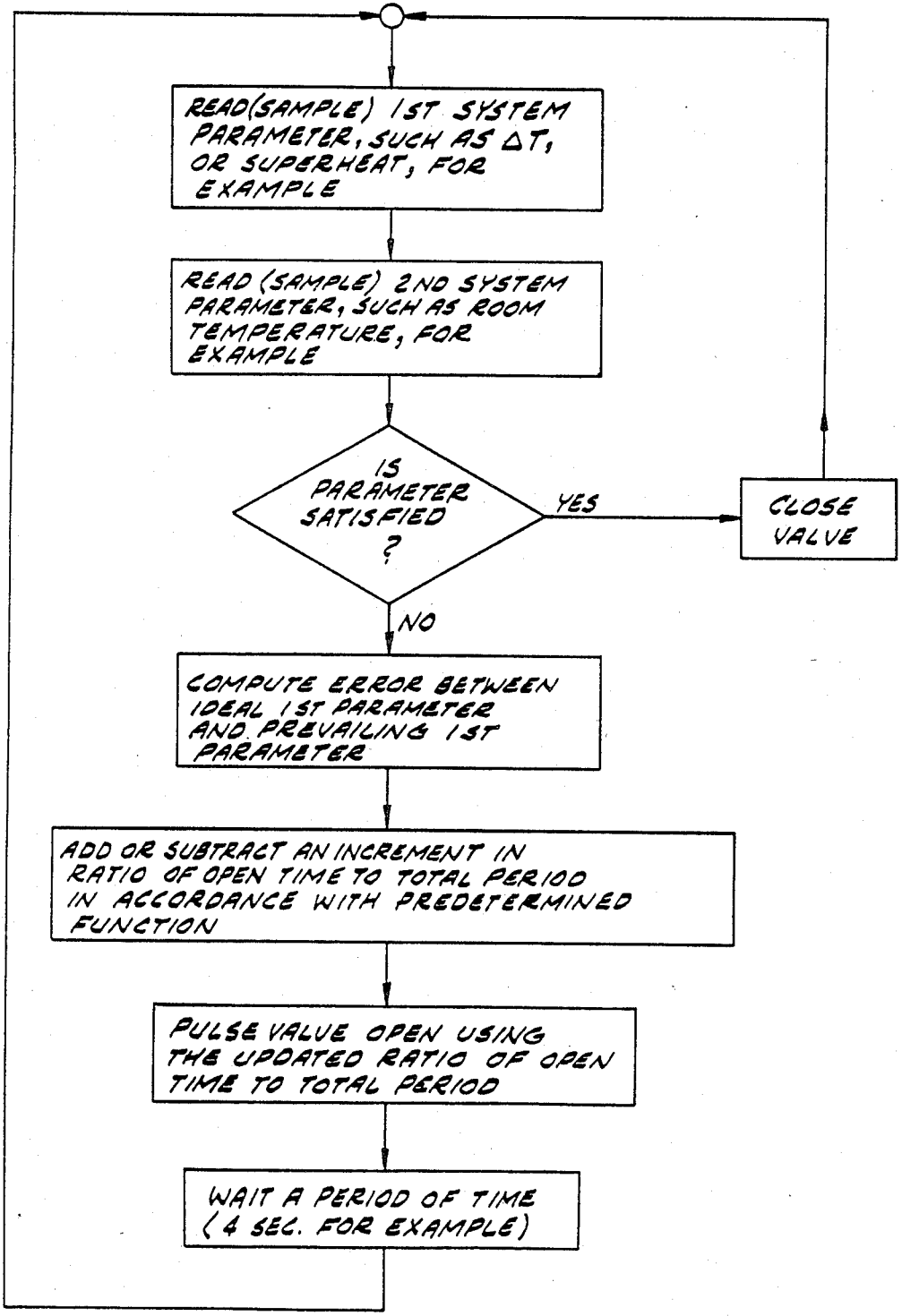
FIG. 6A is a block diagram illustrating the program followed by a control system which is an alternative to that of FIG. 6.

More specifically, control means 57 in this second type of controller is a programmed logic means, such as a microcomputer of the like, operating in accordance with a program whose flowchart is shown in FIG. 6A. In this program, a first system parameter such as temperature difference (delta-T) or superheat, for example, is read (sampled) by the controlled 57. A second system parameter such as room temperature is then sampled. If the second parameter is satisfied, i.e., is within the proper range, valve 15 is closed and the program loops back to the beginning. On the other hand, if the second parameter is not satisfied, controller 57 computes the error between the ideal first parameter and the prevailing first parameter. It then adds or subtracts an increment to or from the ratio of the open time of the valve to the total period in accordance with a predetermined function. Such a function could be a straight line when plotted as a function of superheat error versus increment of change in on-time ratio, for example, although the precise function is not a feature of the present invention. The controller then pulses valve 15 open using the updated ratio of open time to total period. Thereafter it waits a predetermined period of time, such as four seconds, before it resumes execution of the program.

Valve 15, the detailed construction of which was heretofore described, is particularly well-suited for use as an on/off, continuously variable flow valve utilized in accordance with the control system and method of this invention because it has a long service life, even when repeatedly cycled to open and close in the manner heretofore described. Because of the special features of the valve in lessening opening and closing shock of the movable valve member 35 and because of the relatively large contact area of elastomeric valve member 39 on valve seat 27, the valve has a long service life and little or no maintenance is required.

As shown in FIG. 2, valve 15 is a so-called direct acting solenoid valve. However, it will be appreciated that the expansion device upstream from an evaporator E may comprise a large capacity pilot operated valve, such as is well-known in the art.

It will be understood that in some applications, it may be an advantage to have a valve which is open when the solenoid is de-energized, and closed when the solenoid is energized.

Those skilled in the art will recognize that the apparatus and method of this invention may have wide application in a variety of multiple evaporator refrigeration systems including zoned room air conditioning/heat pump applications because selected evaporators may be blocked thus completely stopping the flow of refreigerant therethrough while others of the evaporators will continue to operate with refrigerant flowing therethrough.

Figure 7:
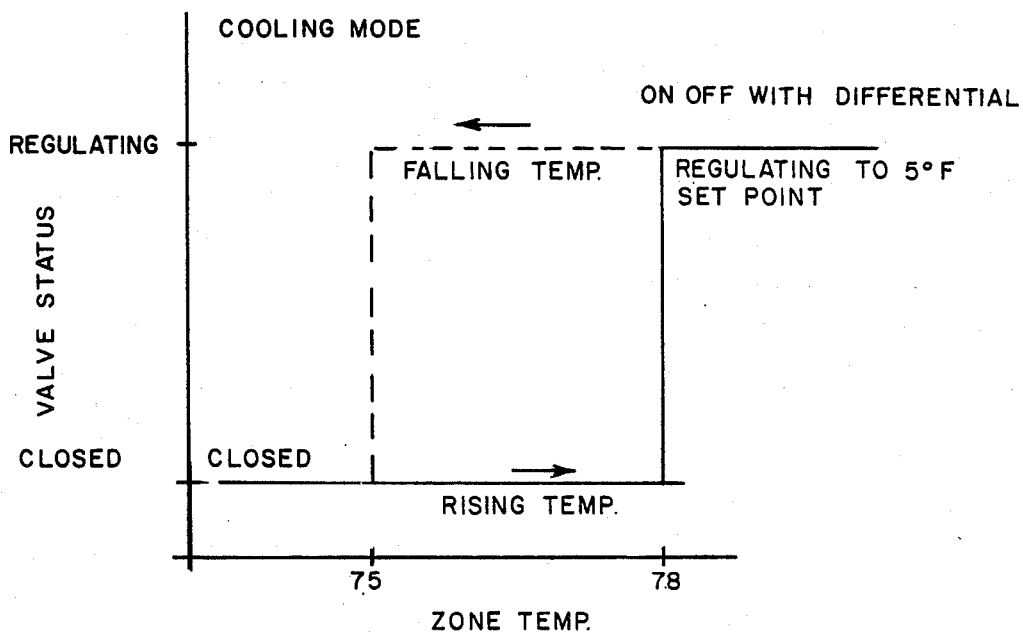
FIG. 7 is a plot of another mode of controlling zone temperature in which the on-off modulation of the control valve, as shown in FIG. 5 is utilized.

Referring now to FIG. 7, operation of the above-described refrigeration apparatus in accordance with the method of this invention will be described in greater detail. As shown by the solid lines in FIG. 7, when the zone parameter or temperature (i.e., the temperature of the refrigerated space served by a particular evaporator coil) is above a first predetermined value (e.g., 75° F.) but below a second predetermined value (e.g., 78° F.), temperature sensor T3 will override control means 57 and maintain valve 15 in its closed condition. This condition is shown by the lower horizontal line in FIG. 7 marked "closed". Upon the zone temperature equalling or exceeding the second predetermined value (e.g., the upper temperature limit of 78° F.), a new output value from the override temperature sensor T3 is fed into the control system 57 which causes the control system to begin regulating control valve 15 by periodically opening and closing the control valve as heretofore described. Normally, the control valve 15 is preset to maintain a superheat set point of, for example, 5° F. As the evaporator (e.g., E1) serving the zone being sensed continues to have refrigerant flow therethrough, the temperature of the zone will fall (as indicated by the dotted lines in FIG. 7) and the control valve will continue to open and close in periodic fashion until the zone temperature has been reduced to the lower predetermined value (e.g., 75° F.). Thus, the offset temperature between the lower temperature value (e.g., 75° F.) at which valve 15 closes and thus blocks or restricts the flow of refrigerant through the evaporator and the upper temperature level (e.g., 78° F.) at which the control valve begins to operate causes the temperature of the zone to be regulated between the desired temperature levels of 75° F. and 78° F. It will be understood by those skilled in the art that a similar control system could be utilized in a heat pump system for heating the zone.

Figure 8:
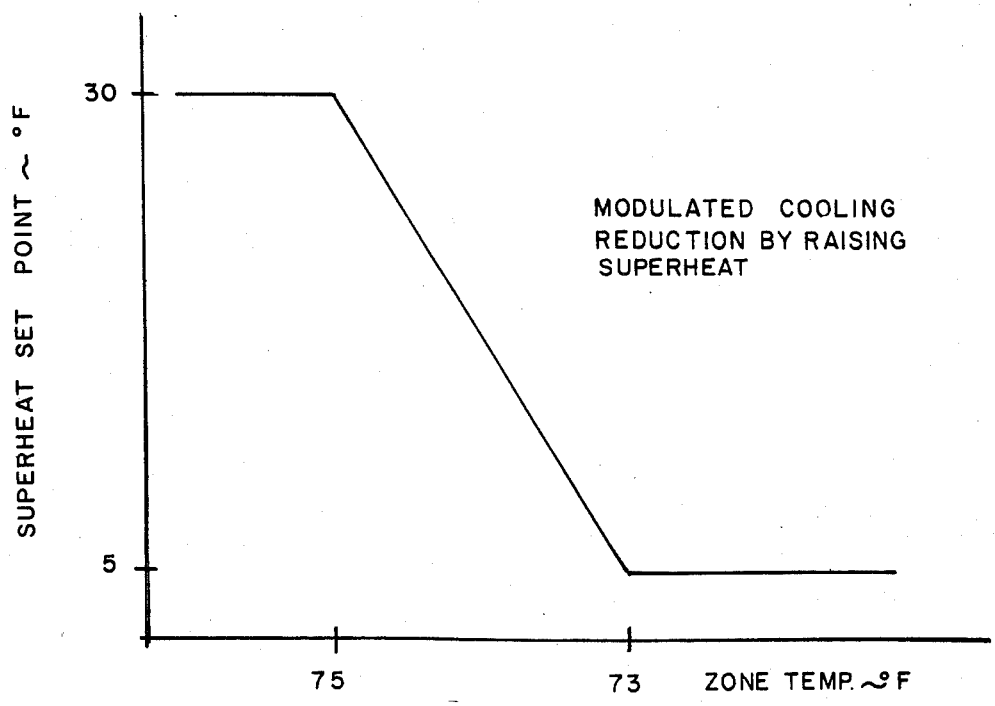
FIG. 8 is a plot of superheat set point versus zone temperature in which the cooling capacity of the evaporator is continuously modulated by raising of the superheat.

Referring to FIG. 8, the control valve 15 together with the control system of the present invention as herein described may be utilized to modulate the cooling of a zone by proportionately raising the superheat setting of the expansion device (e.g., valve 15) by proportionately decreasing the ratio of energization time to the length of period P thus restricting the flow of refreigerant through the evaporator rather than by totally blocking the flow of refrigerant as heretofore described. More specifically, as shown in FIG. 8, when the zone temperature is at a second or higher predetermined level (e.g., 78° F.), the superheat setting of the expansion device (e.g., valve 15) is adjusted or effectively set such that the superheat remains constant at about 5° F. In essence, this insures that substantially the entire length of the evaporator coil is effectively utilized and vaporized refrigerant exists only in the last increment of the expansion coil before the suction outlet However, as the zone temperature drops from the second or higher predetermined level toward a first or lower predetermined level (e.g., 75° F.), control valve 15 is operated so as to have a progressively shorter open time during each period P and thus effectively proportionately increases the effective superheat setting of the valve until a lower predetermined temperature level is attained (e.g., 75° F.) at which time the superheat of the valve is raised to such a high degree (e.g., 30° F.) that the effective cooling length of the evaporator has been substantially reduced. This method of progressively controlling superheat, in certain applications, may be preferable to the method disclosed heretofore in regard to FIG. 7 in that the evaporator coil will continue to cool the zone thereby to effectively maintain humidity control rather than the refrigerant flow being totally blocked, as described in regard to FIG. 7. While control system 57 may require modification to carry out this method of control, such modifications of the schematic, as shown in FIG. 6, will be readily apparent to those skilled in the art and thus are not shown herein.

One method of the present invention of controlling an expansion valve for a multiple evaporator refrigeration system utilizes an on/off solenoid valve 15, such as heretofore described, and a control system 57, such as described above for each of the evaporators. Briefly, this method of this invention comprises monitoring a first parameter associated with each of the evaporators of the refrigeration system, such as the superheat of the suction gas being returned to the inlet of compressor 3 (i.e., the temperature differential between inlet and outlet of evaporator coil). This temperature differential is often considered to be an acceptable approximation of true superheat, particularly on refrigeration coils having a low pressure drop. The control system is then utilized to generate a signal in response to this first parameter and this signal is utilized to effect repeated periodic energization and de-energization of the solenoid valve with the ratio of energization time to the length of the period of each energization cycle is responsive to the signal so as to regulate the flow of refreigerant through the evaporator. The temperature of the refrigerated space served by this one evaporator is monitored, as by sensor T3, and a second signal is generated. Upon this second signal attaining a predetermined level (e.g., 75° F. as shown in FIG. 7), the periodic energization and de-energization of the valve 15 for this refrigerated space is overridden and the valve remains de-energized thereby to restrict or block the flow of refreigerant through the evaporator. Further, upon the temperature of the refrigerated space rising above a second predetermined level (e.g., 78° F. as shown in FIG. 7), the proportional portion of control means 57 is no longer overridden and valve 15 may be periodically energized and de-energized so as to modulate the flow of refreigerant through the evaporator.

Figure 9:
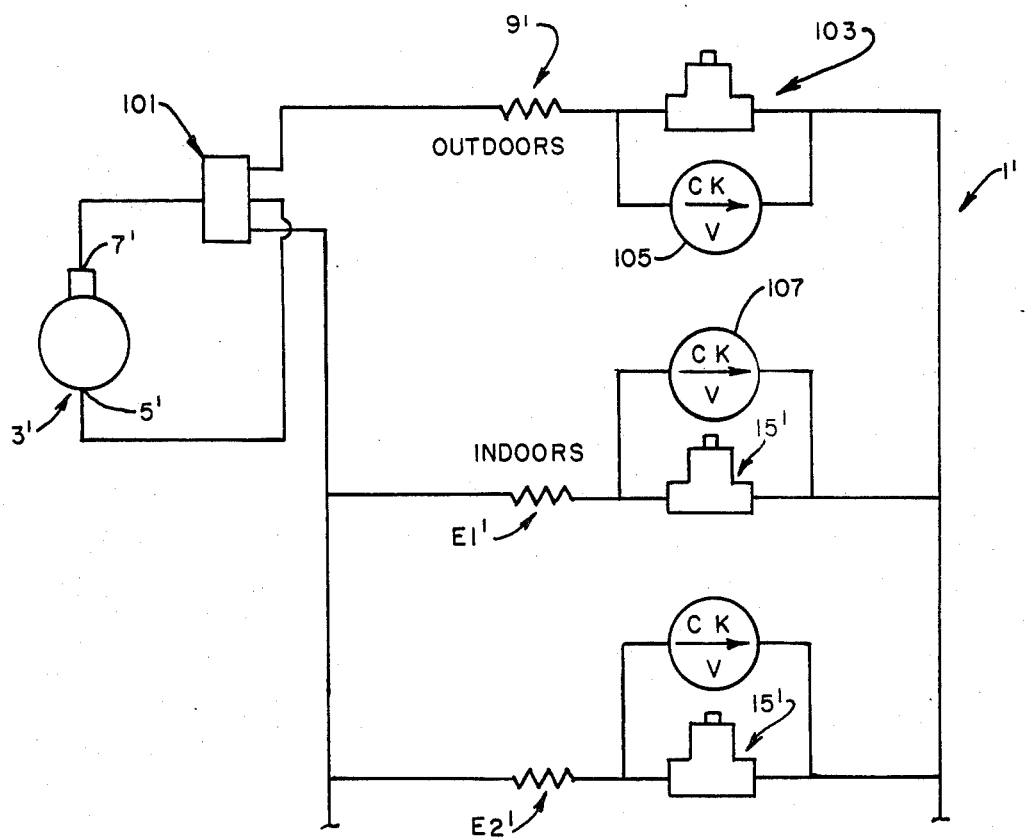
FIG. 9 is a diagrammatic view of a multiple evaporator heat pump system in accordance with this invention.

Referring now to FIG. 9, a multiple evaporator residential heat pump system utilizing the control apparatus and method of this invention is shown. More specifically, the multiple evaporator heat pump system shown in FIG. 9 is, in many respects, similar to the multiple evaporator refrigeration system shown in FIG. 1 and heretofore described in detail. Because of the similarity of construction and operation of the various parts of the multiple evaporator heat pump system shown in FIG. 9, corresponding parts between the two systems have been given corresponding reference characters with similar reference characters in FIG. 9 being indicated as "primed" reference numbers. Thus, a detailed description of these similar parts will not be provided and, instead, only differences between the refrigeration systems of FIGS. 1 and 9 will be discussed in detail.

As is conventional, a heat pump system includes a so-called four-way reversing valve, as indicated at 101, which may be selectively operated to switch the heat pump system between its heating mode and its cooling mode in a manner well known to those skilled in the art. Further, as indicated, the condenser coil 9' is shown to be located out of doors while the multiple evaporators E1', E2'.. are located indoors, for example, each one being located in a respective room of a house or other building. It will be appreciated that when the heat pump system is operated in its heating mode, the outdoor coil 9' serves as an evaporator which picks up heat from its surroundings (e.g., the outside air) and the indoor coils E1', etc. serve as condensers which reject heat into the room. In order to operate the system in its heating mode, it is necessary to provide an expansion device upstream from the outdoor evaporator 9' so as to cause the adiabatic expansion of the refrigerant as it flows through the outdoor evaporator. As shown in FIG. 9, this expansion device is a solenoid operated valve, as generally indicated at 103. It will be understood that the solenoid operated valve 103 can be generally similar in construction and operation to valve 15 heretofore described. Moreover, expansion valve 103 for the out of doors coil unit can be controlled by a control system generally similar to that described in this specification and as is shown in FIG. 6. Because expansion device 103 must have a metering orifice therein, this expansion device would create an excessive back pressure for the refrigerant exiting the out of doors coil 9' when the heat pump system is operating in its cooling mode. Therefore, a bypass checkvalve 105 is provided so as to permit the refrigerant to bypass valve 103 when the heat pump system is operated in its cooling mode.

Likewise, bypass checkvalves 107 are provided for each of the control valves 15' in line with each of the indoor coils E1', etc. so that when the system is operating in its heating mode and so that when the indoor coils are functioning as condensers, the refrigerant may flow readily around the expansion valves 15' to the out of doors expansion device 103. It will be further appreciated by those skilled in the art that the control system shown in FIG. 6 may be modified so as to control operation of each of the indoor coils E1', etc. so as to maintain a desired temperature level within the room.

In view of the above, it will be seen that other objects of this invention are achieved and other advantageous results obtained.

As various changes could be made in the above constructions or methods without departing from the scope of the invention, it is intended that all matter contained in the above description or shown in the accompanying drawings shall be interpreted as illustrative and not in a limiting sense.

I claim:

1. In a refrigeration system having a plurality of heat exchange means, each of said heat exchange means serving a respective space, said system further having a compressor for supplying high pressure liquid refreigerant to each of said heat exchange means, each of said heat exchange means having a length through which said refrigerant flows, wherein the improvement comprises: means associated with each of said heat exchange means for expanding said refrigerant passing therethrough, for selectively blocking the flow of refreigerant therethrough, and for effectively preventing starting or flooding of said heat exchange means, said means comprising a solenoid valve for controlling the flow of high pressure liquid refreigerant through said respective heat exchange means so that said liquid refreigerant is in heat transfer relation with substantially the entire length of said heat exchange means and so that only vaporized refreigerant exists only in the last increment of said heat exchange means thereby to maximize the heat transfer efficiency of said heat exchange means, and sample and hold means for controlling said solenoid valve, said control means having means for sampling a control parameter on an instanteous basis and means for changing the ratio of the open time to the closed time of said solenoid valve in a selected period of time in finite steps in accordance with a predetermined programmed relationship between the instantaneous value of said control parameter and said step.

* * * * *

UNITED STATES PATENT AND TRADEMARK OFFICE
CERTIFICATE OF CORRECTION

PATENT NO. : 4,685,309

DATED : August 11, 1987

INVENTOR(S) : Joseph L. Behr

It is certified that error appears in the above-identified patent and that said Letters Patent is hereby corrected as shown below:

First (cover) page, "[63] Continuation of Ser. No. 643,250, August 22, 1984, Pat. No. 4,578,534 which is a continuation of Ser. No. 438,360, Nov. 1, 1982, abandoned." Should read "[63] Continuation of Ser. No. 643,250, Aug. 22, 1984, abandoned which is a continuation of Ser. No. 438,360, Nov. 1, 1982, abandoned."

Column 1, line 6, "This is a continuation of copending application Ser. No. 643,250, filed on Aug. 22, 1984, now U.S. Pat. No. 4,578,534 which is a continuation of application Ser. No. 438,360, filed Nov. 1, 1982, now abandoned." should read "This is a continuation of copending application Ser. No. 643,250, filed on Aug. 22, 1984, abandoned which is a continuation of application Ser. No. 438,360, filed Nov. 1, 1982 now abandoned.

Abstract, Line 5 is "evaportors" should be "evaporators".

Column 5, Line 53 is "preferably" should be "Preferably".

Column 10, Line 50 is "ope" should be "open".

UNITED STATES PATENT AND TRADEMARK OFFICE
CERTIFICATE OF CORRECTION

PATENT NO. : 4,685,309

DATED : August 11, 1987

INVENTOR(S) : Joseph L. Behr

It is certified that error appears in the above-identified patent and that said Letters Patent is hereby corrected as shown below:

Column 12, Line 64 is "outlet However" should be "outlet thereof. However".

Signed and Sealed this

Twenty-sixth Day of April, 1988

Attest:

DONALD J. QUIGG

*Attesting Officer*        *Commissioner of Patents and Trademarks*

UNITED STATES PATENT AND TRADEMARK OFFICE
CERTIFICATE OF CORRECTION

PATENT NO. : 4,685,309

DATED : August 11, 1987

INVENTOR(S) : Joseph L. Behr

It is certified that error appears in the above-identified patent and that said Letters Patent is hereby corrected as shown below:

In the Abstract and Columns 1 to 16, "refreigerant", each occurrences, should read -- refrigerant --.

Signed and Sealed this

Thirtieth Day of August, 1988

Attest:

DONALD J. QUIGG

Attesting Officer

Commissioner of Patents and Trademarks